United States Patent [19]

Kawamura

[11] Patent Number: 5,054,013

[45] Date of Patent: Oct. 1, 1991

[54] TRACK TRANSVERSE DETECTION SIGNAL GENERATING CIRCUIT

[75] Inventor: Katsumi Kawamura, Tokorozawa, Japan

[73] Assignee: Pioneer Electronic Corporation, Tokyo, Japan

[21] Appl. No.: 492,165

[22] Filed: Mar. 13, 1990

[30] Foreign Application Priority Data

Mar. 13, 1989 [JP] Japan .................................. 1-60071

[51] Int. Cl.[5] ........................... G11B 7/00; G11B 7/08
[52] U.S. Cl. ............................... 369/44.28; 369/44.25; 369/30; 369/33
[58] Field of Search ............... 369/44.28, 44.25, 44.29, 369/44.35, 44.36, 44.37, 30, 33, 56

[56] References Cited

U.S. PATENT DOCUMENTS

| 4,330,880 | 5/1982 | Van Dijk | 369/44.25 |
| 4,611,316 | 9/1986 | Takeuchi | 369/44.25 |
| 4,627,038 | 12/1986 | Abed | 369/30 |
| 4,698,795 | 10/1987 | Yoshio | 369/44.29 |
| 4,817,073 | 3/1989 | Suzuki | 369/44.28 |
| 4,819,219 | 4/1989 | Nagano | 369/33 |
| 4,835,754 | 5/1989 | Yamamoto | 369/44.28 |
| 4,860,271 | 8/1989 | Yokogawa | 369/44.25 |
| 4,887,253 | 12/1989 | Tateishi | 369/44.28 |

FOREIGN PATENT DOCUMENTS 0289309 11/1988 European Pat. Off. ......... 369/44.28

Primary Examiner—Stuart S. Levy
Assistant Examiner—John Pokotylo
Attorney, Agent, or Firm—Sughrue, Mion, Zinn, Macpeak & Seas

[57] ABSTRACT

A track transverse detection signal generating circuit in a LD or a CD player, which comprises a presence signal amplifier for amplifying a presence signal indicating that an optical spot for reading information exists on a recording track, a controller for receiving a speed signal corresponding to a moving speed of the optical spot for reading information on the recording track to control an amplification level of the presence signal amplifier in response to the moving speed of the optical spot, and a presence signal comparator for receiving the presence signal which has been amplified and transmitted from the presence signal amplifier, for making a comparison between the amplified presence signal and a reference value, and for transmitting a pulse-shaped track transverse detection signal. Therefore, a track transverse detection signal can be reliably generated by raising the gain of the presence signal amplifier or lowering the reference value of the present signal comparator in the case of a track jump operation in which the optical pickup moves at a speed higher than that in the case of an operation of reproducing the optical disk normally and in the case of a high speed accessing operation in which the same moves at a further raised speed.

8 Claims, 6 Drawing Sheets

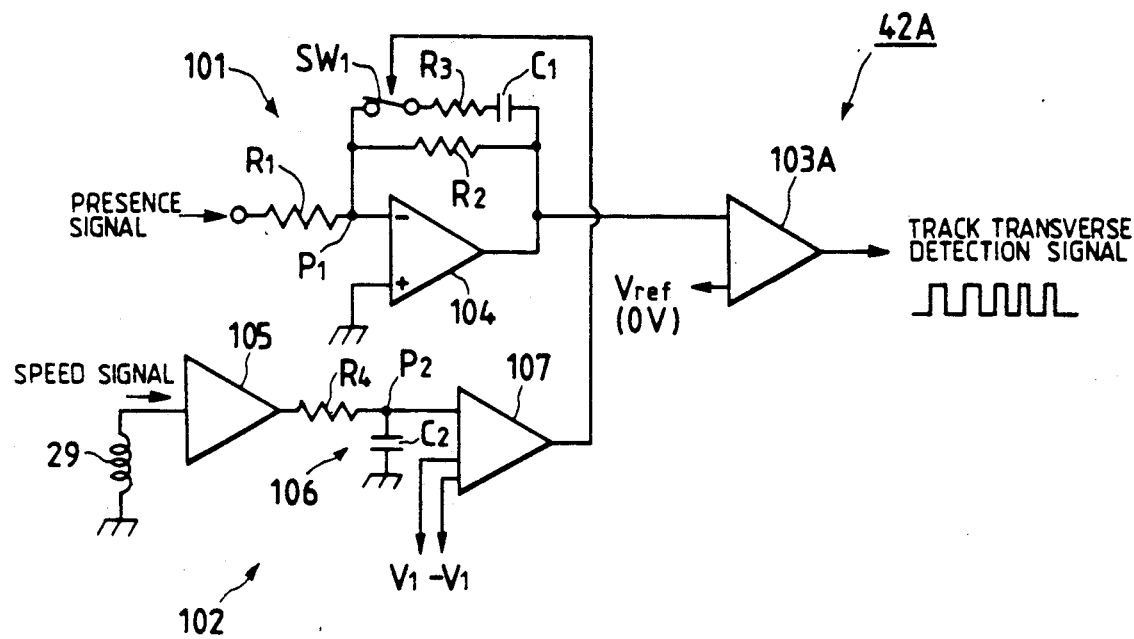
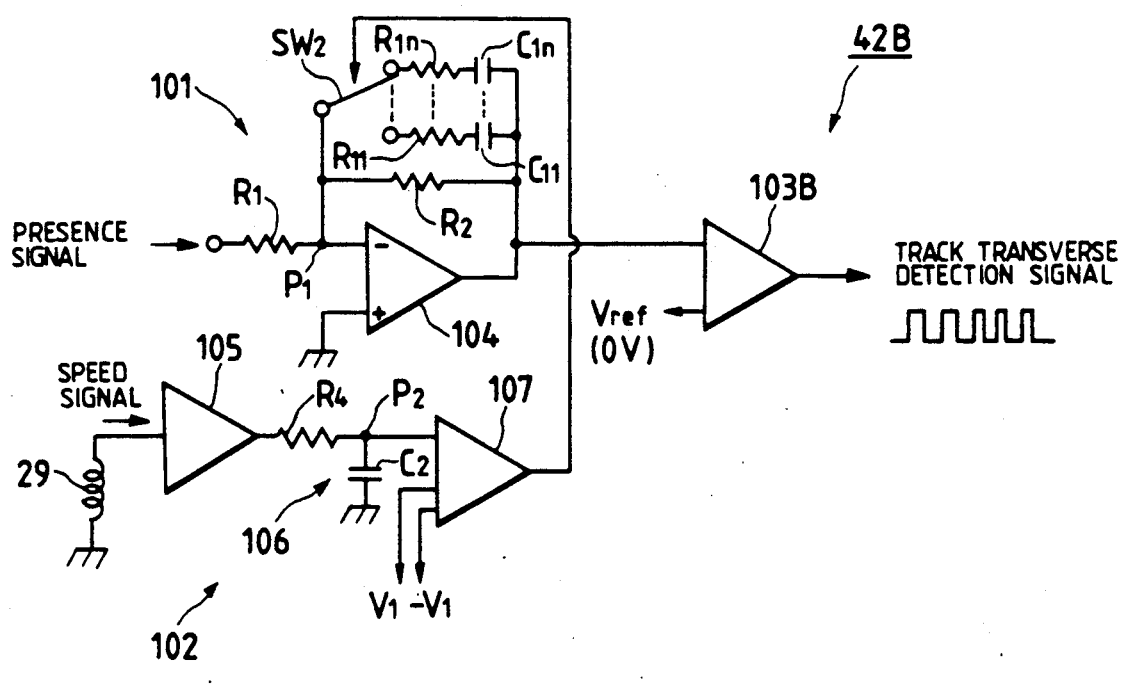

TRACK TRANSVERSE DETECTION SIGNAL GENERATING CIRCUIT

BACKGROUND OF THE INVENTION

The present invention relates to an optical apparatus for reproducing information recorded on an information recording medium, and more particularly, to a track transverse detection signal generating circuit.

Previously optical disks have served as optical information recording medium which use laser technology. As the optical disk, a laser video disk (an LVD) is well known for recording visual information, while a digital audio disk (a DAD) is well known for recording audio information, the DAD is based upon a compact disk (a CD) system.

The optical disk stores information recorded on its spiral track which extends from the inner portion toward the outer portion, the track being formed by a multiplicity of signal pits.

Optical disk players such as a LVD player and a DAD player are used to serve as an optical apparatus for reproducing recording information. The reproduction output is obtained by reading information from a surface of the optical disk on which information has been recorded, the optical disk player having an optical pickup therefor.

The optical pickup follows the track of the optical disk rotating at a predetermined rotational speed and applies an optical beam spot to the track so as to convert a beam reflected from a signal pit into an electric signal (an RF signal. RF: an abbreviation of Radio Frequency).

In order to cause the optical pickup to follow the signal track, it is necessary for the optical pickup to be slid in a radial direction of the optical disk and for the optical beam spot to be correctly applied to the track. A slide feeding mechanism and a tracking actuator are therefore used. A servo circuit is employed for the purpose of reliably controlling a slide feed distance and a tracking action. A specific servo circuit includes a slider servo circuit and a tracking servo circuit.

When the optical disk player reproduces information, the optical beam radiated from the optical pickup accurately traces the track from its inner portion toward the outer portion. However, in recent years optical disk players have been improved to offer a multiplicity of special functions such as a high speed searching function capable of conducting a retrieval of a required image and a still image reproducing function. When the above-described special operations are performed, a track jump is necessary during which the optical pickup jumps and slides over a plurality of tracks in the radial direction of the optical disk, (i.e., the optical pickup traverses the tracks).

In this case, the optical pickup detects a location in the optical disk during the jump by using the reflected light beam spot so as to supply a control signal to the tracking servo circuit and the slider servo circuit. The tracking servo circuit is therefore arranged to include a track transverse detection signal generating circuit. In the tracking servo circuit, before the pickup is moved to a target track, the number of tracks located between a current track and the target track is calculated. The pickup is then moved until the traversed number of tracks coincides with the calculated number of tracks.

In order to count the number of tracks, a zero-cross comparator is used for detecting a zero-crossing of a tracking error signal. A comparison output from the zero-cross comparator is generally used for a track transverse detection signal. In this case, a low pass filter (LPF) for determining a low cutoff frequency is provided on the input side of the zero-cross comparator to eliminate the influence of intermediate and high frequency component noises. The filter also eliminates the leakage of a digital voice signal in a video disk, whereby stability of track-jumping is maintained.

When the cutoff frequency is low and the pickup is moved quickly to perform high speed jumping, a gain sufficient to detect the zero-crossing of the tracking error signal cannot be obtained by the zero-crossing comparator due to delay characteristics of output signals of the low pass filter and a high speed track traversal of the pickup. Therefore, the track transverse detection signal cannot be accurately detected at the time of the high speed track jumping.

SUMMARY OF THE INVENTION

An object of the present invention is to provide an optical apparatus for performing a high speed access while maintaining track jumping stability.

According to the embodiments of the present invention, the amplification level and equalization characteristics of the output of an amplifying means in a track transverse detection signal generating circuit or a reference value of the amplifier output is controlled in accordance with a speed of an optical pickup in a direction perpendicular to a recording track. This pickup motion is performed during an operation of reproducing the optical information in a special manner. In particular, if the speed of an optical pickup is high, the control is conducted such that the amplification level or a cutoff frequency is raised, or the reference value is lowered. The output of this amplifier means will hereafter be referred to as a presence signal. The presence signal indicates whether an optical spot is aligned with a recording track.

According to an embodiment of the present invention, a track transverse detection signal generating circuit comprises: presence signal amplifying means for amplifying a presence signal contained in a light beam of an optical spot for reading information reflected from the surface of an optical information medium, said presence signal denoting a fact that said optical spot for reading information is present on a recording track of said optical information recording medium;

presence signal comparison means for receiving said presence signal which has been amplified and transmitted from said presence signal amplifying means, making a comparison between said amplified presence signal and a reference value, and transmitting a pulse-shaped track transverse detection signal denoting a fact that said optical spot for reading information has traversed said recording track;

speed detecting means for detecting a moving speed of the pickup in a radial direction of the pickup; and means for controlling the amplifying means so as to change at least one amplification level of said presence signal amplifying means, equalization characteristics thereof and a reference level of said presence signal comparison means in response to the moving speed of said pickup.

Other objects and aspects of the invention will become apparent from the following description of embodiments with reference to the accompanying drawings.

BRIEF DESCRIPTION OF THE DRAWINGS

In the accompanying drawings:

FIG. 4 is a circuit diagram which illustrates a first embodiment of the track transverse detection signal generating circuit according to the present invention; and FIGS. 5 to 8 are circuit diagrams which illustrate other embodiments of the track transverse detection signal generating circuit according to the present invention, respectively.

DESCRIPTION OF THE PREFERRED EMBODIMENTS

Referring to the accompanying drawings, embodiments of the present invention will now be described.

Figure 1:
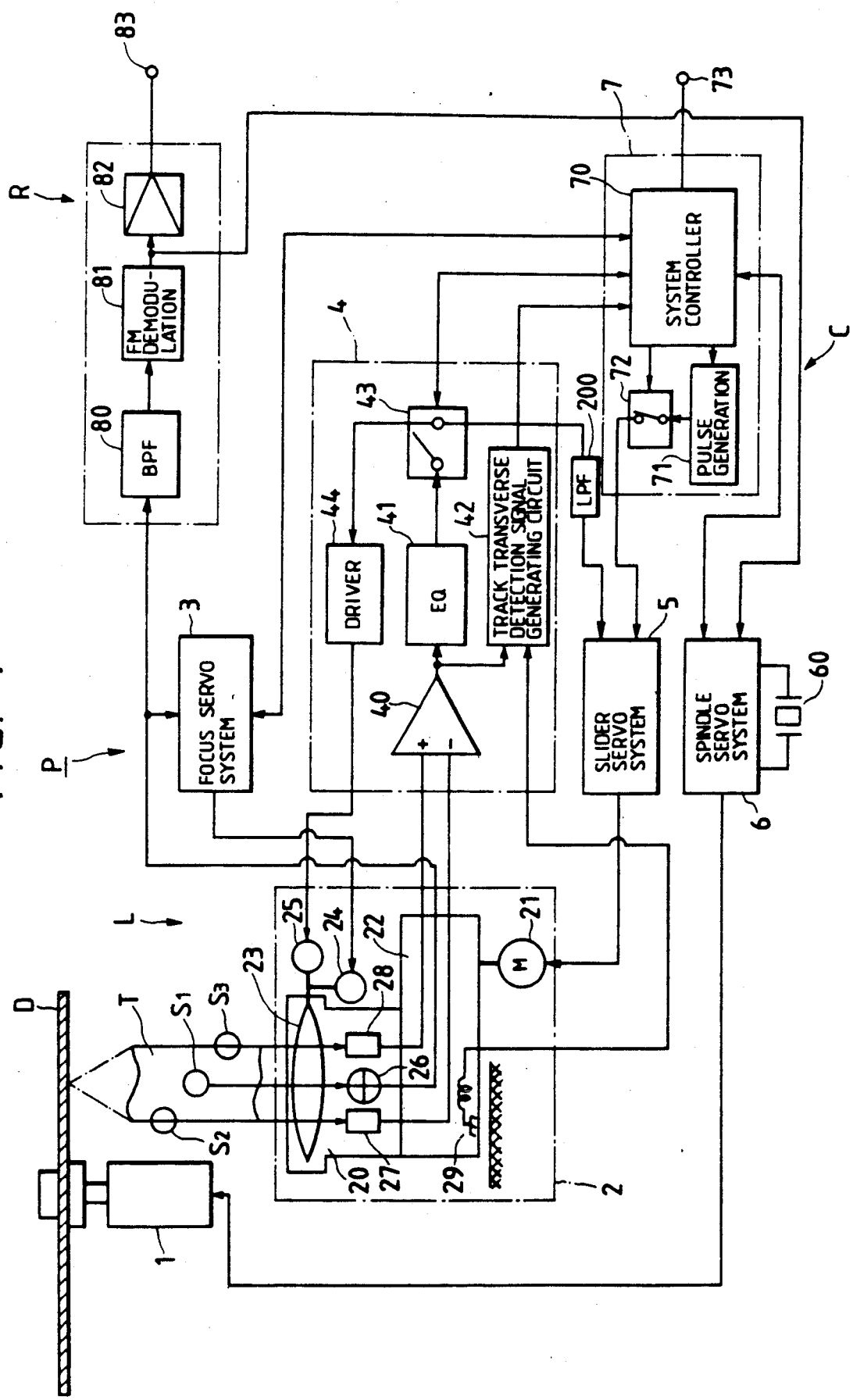
FIG. 1 is a block diagram of an embodiment of an optical apparatus for reproducing an information recording medium provided with a track transverse detection signal generating circuit according to the present invention.

FIG. 1 is a block diagram of an embodiment of an optical disk player of an optical apparatus for reproducing an information recording medium provided with a track transverse detection signal generating circuit according to the present invention.

An optical disk player P comprises an information reading block L, a control block C and a reproducing block R.

The information reading block L optically reads information stored on a rotated optical disk to output electric signals. The control block C controls the information reading block L and the overall action of the optical disk player P. The reproducing block R receives the electric output from the information reading block L, demodulates, amplifies and outputs it.

The information reading block L comprises a spindle motor 1 and an optical head 2.

The spindle motor 1 rotates an optical disk D.

Optical head

The optical head 2 optically reads information stored in signal pits arranged on a track T on the optical disk D which is being rotated so as to electrically output the information in the form of an RF signal and a variety of servo signals.

The optical pickup 20 radiates a laser beam to the optical disk D, receives and converts a reflected laser beam into an electric signal so as to output it. The slider 22 holds the optical pickup 20 so as to optionally slide it in a radial direction of the optical disk D. The slider motor 21 drives the slider 22.

The optical pickup 20 comprises an objective lens 23, a focusing actuator 24, a tracking actuator 25 and optical/electrical converting elements 26 to 28.

The objective lens 23 receives optical spots $S_1$ to $S_3$ for reading information. The three optical spots $S_1$ to $S_3$ for reading information are simultaneously applied to the track T. The focusing actuator 24 is attached to the objective lens 23 so as to longitudinally move the objective lens 23 toward the objective lens focal point. Specifically, an electromagnetic coil or the like is employed to serve as the focusing actuator 24. The tracking actuator 25 is also attached to the objective lens 23 so as to move the objective lens 23 in a direction perpendicular to the track. Also an electromagnetic coil or the like is employed as the tracking actuator 25.

The optical/electrical converting element 26 detects a reflected beam of the optical spot $S_1$ to output an electric signal. The optical/electrical converting element 27 detects a reflected beam of the optical spot $S_2$ radiated at an end portion of the track T of the optical disk D to output an electric signal. The optical/electrical converting element 28 detects a reflected beam of the optical spot $S_3$ radiated at another end portion of the track T of the optical disk D to output an electric signal.

Specifically, photo-diodes are employed so as to serve as the above-described optical/electrical converting elements.

The slider 22 includes a speed detection coil 29 so as to serve as speed detecting means. The speed detection coil 29 detects a moving speed of the slider 22, that is, a moving speed of the optical pickup 20 in the radial direction of the optical disk D so as to output an induced voltage as a speed signal which corresponds to the moving speed thus detected.

The control block C comprises four servo systems 3 to 6 and a control system 7.

Focus servo system

The focus servo system 3 controls the focal point of the objective lens 23 in accordance with the electric signal supplied from the optical/electrical converting element 26.

The focus servo system 3 is connected to the optical/electrical converting element 26 and the focusing actuator 24. The focus servo system 3 generates a control signal which causes the objective lens 23 to move to maintain the focal point of the lens at the surface of the track T of the optical disk D when the focal point of the objective lens 23 moves away from the surface of the track T of the optical disk D. The control signal thus generated is transmitted to the focusing actuator 24. The focus servo system 3 is also connected to and controlled by a system controller 70 of the control system 7.

Tracking servo system

The tracking servo system 4 controls the positions of the optical spots $S_1$ to $S_3$ for reading information. This control is conducted in accordance with the electric signal supplied from the optical head 2.

The tracking servo system 4 comprises a differential amplifier 40, an equalizer 41, a track transverse detection signal generating circuit 42, a switch 43 and a driver circuit 44.

The differential amplifier 40 has a positive side input terminal connected to the optical/electrical converting element 28, while a negative side input terminal thereof is connected to the optical/electrical converting element 27. As a result, the output from the differential amplifier 40 is formed by the difference between the electric output from the optical/electrical converting element 28 and that from the optical/electrical converting element 27. The differential output is a tracking error signal which represents of presence signals.

The equalizer 41 is connected to an output terminal of the differential amplifier 40. The equalizer 41 compensates for a frequency characteristic and a phase characteristic of the output from the differential amplifier 40.

The track transverse detection signal generating circuit 42 is connected to the output terminal of the differential amplifier 40. The track transverse detection signal generating circuit 42 detects when the optical spot $S_1$ for reading information has traversed the track T in accordance with the change of the tracking error signal. The track transverse detection signal generating circuit 42 outputs a track transverse detection signal in the form of a pulse signal.

The switch 43 is connected to an output terminal of the equalizer 41. An output terminal of the switch 43 is connected to the slider servo system 5 and the driver circuit 44. Furthermore, the switch 43 is connected to the system controller 70 of the control system 7 so that it performs a switching operation in response to a command issued by the system controller 70.

As a result, the tracking error signal supplied from the differential amplifier 40 is compensated in the equalizer 41, and then it is supplied to the slider servo system 5 and the driver circuit 44 when the switch 43 has been switched on. When the optical spot $S_1$ for reading information is applied to the central portion of the track T, the level of the tracking error signal, which is the differential output of the differential amplifier 40, becomes zero. If the optical spot $S_1$ deviates from the central portion of the track T and approaches either side of it, the level of the tracking error signal becomes a positive or a negative level.

The driver circuit 44 amplifies the tracking error signal which causes the optical spot $S_1$ to again return to the central portion of the track T when it receives the tracking error signal whose level is not zero, the amplified tracking error signal being supplied to the tracking actuator 25. In the above-described normal reproducing operation, the slider servo system 5 slides the slider 22 at a speed which is necessary to perform the normal tracking operation.

Slider servo system

The slider servo system 5 controls the movement of the slider 22 in the radial direction of the optical disk D.

The slider servo system 5 is connected to the switch 43, another switch 72 and the slider motor 21. The slider servo system 5 receives a low frequency signal component from a low pass filter 200 provided between the switch 43 and the slider servo system in the normal operation for reproducing the optical disk D and generates a control signal to the slider motor 21. In a track jump operation or a high speed accessing operation, the slider servo system 5 receives a pulse signal from the switch 72 and generates a control signal for causing the jump operation so as to output it to the slider motor 21.

Spindle servo system

The spindle servo system 6 controls the spindle motor 1 at a predetermined speed. The spindle servo system 6 comprises a reference signal generating circuit 60. The spindle servo system 6 is connected to the system controller 70 of the control system 7 and an output terminal of an FM demodulation circuit 81 of the reproducing block R.

The spindle servo system 6 makes a comparison between a synchronizing signal contained in an output signal from the FM demodulation circuit 81 and a reference synchronizing signal generated by the reference signal generating circuit 60. From this comparison the spindle servo system 6 generates a control signal so as to output it to the spindle motor 1 if the rotating speed of the spindle motor 1 deviates from the predetermined speed. This control signal causing the spindle motor 1 to again rotate at the predetermined speed.

Control system

The control system 7 controls each of the servo systems 3–6 and the overall operation of the optical disk player P.

The control system 7 comprises a system controller 70, a pulse generation circuit 71, a switch 72 and an external operation terminal 73.

The system controller 70 comprises a microprocessor, a read only memory (ROM) and a random access memory (RAM) which are omitted from illustration. The system controller 70 is connected to the focus servo system 3, the tracking servo system 4, the slider servo system 5 and the spindle servo system 6 so as to control these four servo systems. The control system 7 can be controlled from the external side thereof with a control signal supplied form a operation keyboard, a microcomputer or the like through the external operation terminal 73.

The pulse generation circuit 71 is connected to the system controller 70 and the switch 72. The pulse generation circuit 71 receives a command signal issued from the system controller 70 and generates a pulse signal so as to supply it to the switch 72.

The switch 72 has an input terminal connected to the pulse generation circuit 71, while it has an output terminal connected to the slider servo system 5. The switch 72 is also connected to the system controller 70 so as to perform a switching action in response to a command signal issued from the system controller 70.

Reproducing block

The reproducing block R demodulates the RF signal into a video signal and an audio signal and amplifies them so as to output them.

The reproducing block R is connected to the optical/electrical converting element 26.

The reproducing block R comprises a band-pass filter 80, an FM demodulation circuit 81, an amplification circuit 82 and an external output terminal 83.

The band-pass filter 80 separates the RF signal supplied from the optical/electrical converting element 26 into a video frequency band and an audio frequency band so as to output them to the FM demodulation circuit 81.

The FM demodulation circuit 81 includes a video signal demodulating portion and an audio signal demodulating portion which are omitted from illustration. Each of the demodulating portions FM-demodulates the RF signals of the corresponding bands which have been separated by the bandpass filter 80 so as to be supplied to the amplification circuit 82.

The amplification circuit 82 includes a video signal amplifying portion and an audio signal amplifying portion which are omitted from illustration. Each of the amplifying portion amplifies each of signal outputs from the FM demodulation circuit 81 so as to output it to the external output terminal 83.

Operation of the optical disk player

The description hereafter will mainly relate to the operation of the optical head 2, the tracking servo system 4, the slider servo system 5 and the control system 7.

The three optical spots $S_1$, $S_2$ and $S_3$ for reading information are simultaneously projected on the recording track T on the optical disk D. A reflected beam of the optical spot $S_3$ for reading information, projected to an end of the recording track T is received by the optical/electrical converting element 28. The optical/electrical converting element 28 supplies an electric output which corresponds to the quantity of incident light of the optical spot $S_3$ to the positive input terminal of the differential amplifier 40 of the tracking servo system 4. On the other hand, a reflected beam of the optical spot $S_2$ for reading information, projected to another end of the recording track T is received by the optical/electrical converting element 27. The optical/electrical converting element 27 supplies an electric output which corresponds to the quantity of incident light of the optical spot $S_2$ to the negative input terminal of the differential amplifier 40 of the tracking servo system 4.

The differential amplifier 40 of the tracking servo system 4 outputs the difference between the output of the optical/electrical converting element 27 of the output from the optical/electrical converting element 28 as the tracking error signal.

FIG. 2 shows the relationship between the positions of the optical spots $S_1$, $S_2$ and $S_3$ for reading information, the positions of the tracks $T_1$ and $T_2$ and a change in the tracking error signal.

Figure 2A:
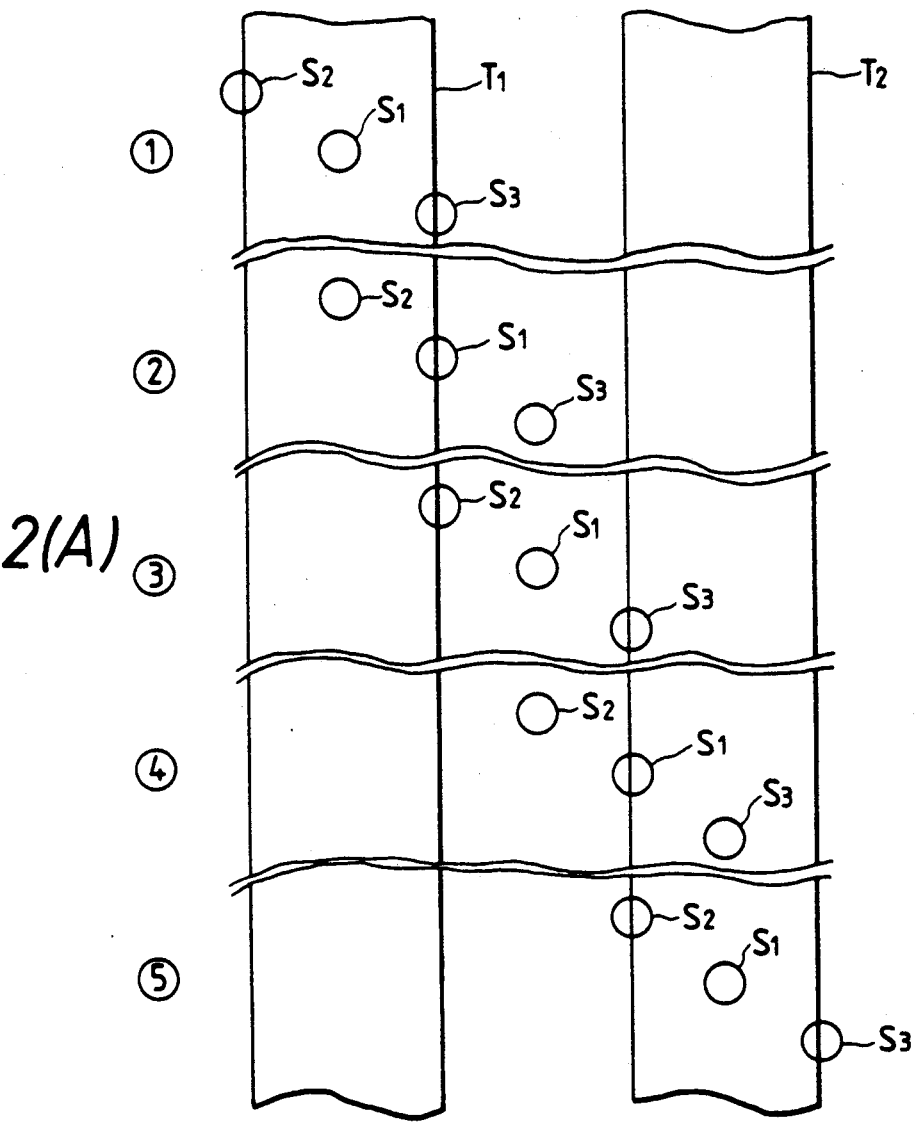
FIGS. 2A and 2B illustrate a relationship between a position of optical spots for reading information about the tracks of the optical disk and a signal level of tracking error signal.

Referring to FIG. 2A, pits storing recorded information are formed on the tracks $T_1$ and $T_2$ in the directions of the tracks $T_1$ and $T_2$. As a result, beams reflected on the surface of the tracks $T_1$ and $T_2$ are diffused by the pits, which leads to the fact that the quantity of light incident into the optical/electrical converting element is reduced. Since no pit exists in an intermediate portion between the tracks $T_1$ and $T_2$, the quantity of diffused light is small and the quantity of reflected light is large, causing the quantity of light incident into the optical/electrical converting element to be enlarged.

Therefore, in a case as indicated by ① of FIG. 2A where the optical spot $S_1$ for reading information is applied to the central portion of the track $T_1$, the quantity of reflected light of the spots $S_3$ and that of spot $S_2$ become the same. Therefore, the level of the tracking error signal which is the output from the differential amplifier 40 becomes zero as indicated by ① of FIG. 2B. In a case 2 shown in FIG. 2A where the optical spot $S_1$ has been moved to a position in the track $T_1$ adjacent to the track $T_2$, the quantity of reflected light of the spot $S_3$ becomes larger than that of optical spot $S_2$. Therefore, the level of the tracking error signal becomes, as shown in 2 of FIG. 2B, a positive value. In a case 3 shown in FIG. 2A where all of the three optical spots $S_1$, $S_2$ and $S_3$ have been moved to an intermediate portion between the tracks $T_1$ and $T_2$, the reflected light from the optical spots $S_3$ and that from the optical spot $S_2$ become the same. Therefore, the level of the tracking error signal becomes zero as indicated by ③ of FIG. 2B. In a case 4 of FIG. 2A where the optical spot $S_1$ has reached an end portion of the track $T_2$, the reflected light of the optical spot $S_3$ becomes smaller than that of the optical spot $S_2$. Therefore, the level of the tracking error signal becomes a negative value as indicated by ④ of FIG. 2B. In a case as indicated by 5 of FIG. 2A where the optical spot $S_1$ has moved to a central portion of the track $T_2$, the level of the tracking error signal becomes zero as indicated by ⑤ of FIG. 2B similarly to the case where the optical spot $S_1$ has existed on the central portion of the track $T_1$.

Figure 2B:
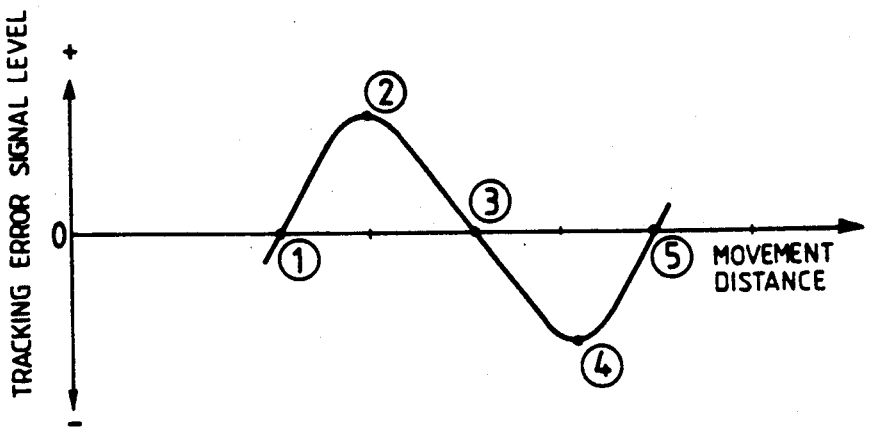

As shown in FIG. 2B, in the case where the optical spot $S_1$ traverses the track, the change in the tracking error signal due to the passage of time becomes a wave in the form of a sine wave.

When the spot $S_1$ traverses a track, the sine wave advances by one wavelength. When the spot $S_1$ traverses the central portion of the track or the intermediate portion between two adjacent recording tracks, the tracking error signal intersects the zero level.

In an operation in which information from the optical disk is reproduced in a normal manner, a frequency and a phase characteristic of the tracking error signal are compensated by the equalizer 41, and then the switch 43 is switched on so that the tracking error signal is supplied to the tracking actuator 25 included in the optical pickup 20 via the driver circuit 44.

The tracking actuator 25 is capable of moving the optical spot $S_1$ so as to return it to the central portion of the track T in accordance with the level of the tracking error signal. This movement allows the optical spot $S_1$ for reading information to pursue the track T correctly. The slider servo system 5 is capable of operating the slider motor 21 with a speed with which the optical spot $S_1$ for reading information corresponding to the rotation of the optical disk can be always applied to the surface of the track T corresponding to the rotation of the disk D.

On the other hand, a control different from the above-described control is performed when the optical disk player performs a track jump operation such as a still image reproduction or a triple speed reproduction in which a plurality of tracks are jumped. The control also differs when player performs a special reproduction such as a high-speed access reproduction for random access play, during which the operating track jumping is done with a higher speed than the speed of the other track jump operations.

The system controller 70 switches off the switch 43 so as to stop the normal slider servo operation. Simultaneously, the system controller 70 issues a command signal to the pulse generation circuit 71 so that the pulse generation circuit 71 generates a jump pulse signal which causes the slider 22 to be moved in the radial direction with a higher speed than the normal speed. The system controller 70 simultaneously issues a command signal so as to operate the switch 72. As a result, the jump pulse signal generated by the pulse generation circuit 71 is supplied to the slider servo system 5. The slider servo system 5 amplifies the jump pulse signal and supplies the jump pulse signal thus amplified to the slider motor 21. When the slider motor 21 receives the jump pulse signal, the slider motor 21 moves at a higher speed than the normal speed, causing the slider 22 to be moved in the radial direction of the optical disk D with a speed which is higher than the speed at the normal reproducing operation. The tracking error signal calculated and transmitted from the above-described differential amplifier 40 becomes a wave like a sine waveform, where one wavelength denotes a fact that the optical spot $S_1$ for reading information has traversed one track T.

At this time, the moving speed of the slider 22, that is, the moving speed of the optical pickup 20 is detected by the speed detection coil 29, the speed thus detected being then supplied to the track transverse signal generating circuit 42 according to the present invention as a speed signal.

The tracking error signal is supplied to the track transverse detection signal generating circuit 42. The track transverse detection signal generating circuit 42 detects that the optical spot $S_1$ has traversed the track T, the detection being made from a change in the tracking error signal. A pulse-shaped track transverse detection signal is transmitted whenever the spot $S_1$ for reading information. The pulse-shaped track transverse detection signal is supplied to the system controller 70. The system controller 70 detects the number of the tracks traversed by counting the number of the pulses of the track transverse detection signals.

The system controller 70 registers the track number, to which a desired position which must be reached by the optical spot is assigned, the number being counted from the innermost track which is arranged to be number "one", and the track number being called "a serial number" hereinafter. Furthermore, the system controller 70 stores the serial number of the track to which the position, at which the jumping has been started, is assigned.

The system controller 70 is arranged to previously calculate the difference between a current address and a target address.

As a result, the number of the tracks, that is, the required number of the jump tracks, positioned between the current track and the target track can be acknowledged so as to subject this required number to a comparison made with the sum of the traversed track numbers.

At the time just before the sum of the traversed track numbers and the required number of the jump tracks coincide with each other, the system controller 70 issues a command signal to the pulse generation circuit 71 so as to cause the pulse generation circuit 71 to generate a brake pulse signal. Simultaneously, the system controller 70 causes the switch 72 to be switched on so that the brake pulse signal is supplied to the slider servo system 7. The slider servo system 5 amplifies the brake pulse signal so as to supply it to the slider motor 21. When the slider motor 21 receives the brake pulse signal, it rotates at a lower speed so that the moving speed of the slider 22 in the radial direction of the optical disk D is decreased.

When the sum of the traversed track numbers coincides with the required number of the jump tracks, the system controller 70 issues a command signal to the pulse generation circuit 71 so as to cause the pulse generation circuit 71 to generate a stop pulse signal which gives an inverse direction voltage to the slider motor 21. The system controller simultaneously switches on the switch 72 so as to cause the stop pulse signal to be supplied to the slider servo system 5. The slider servo system 5 amplifies the stop pulse signal so as to supply it to the slider motor 21. Then, the system controller 70 switches on the switch 43 and switches off the switch 72 so as to cause the normal tracking servo and the slider servo operations are restored.

Figure 3:
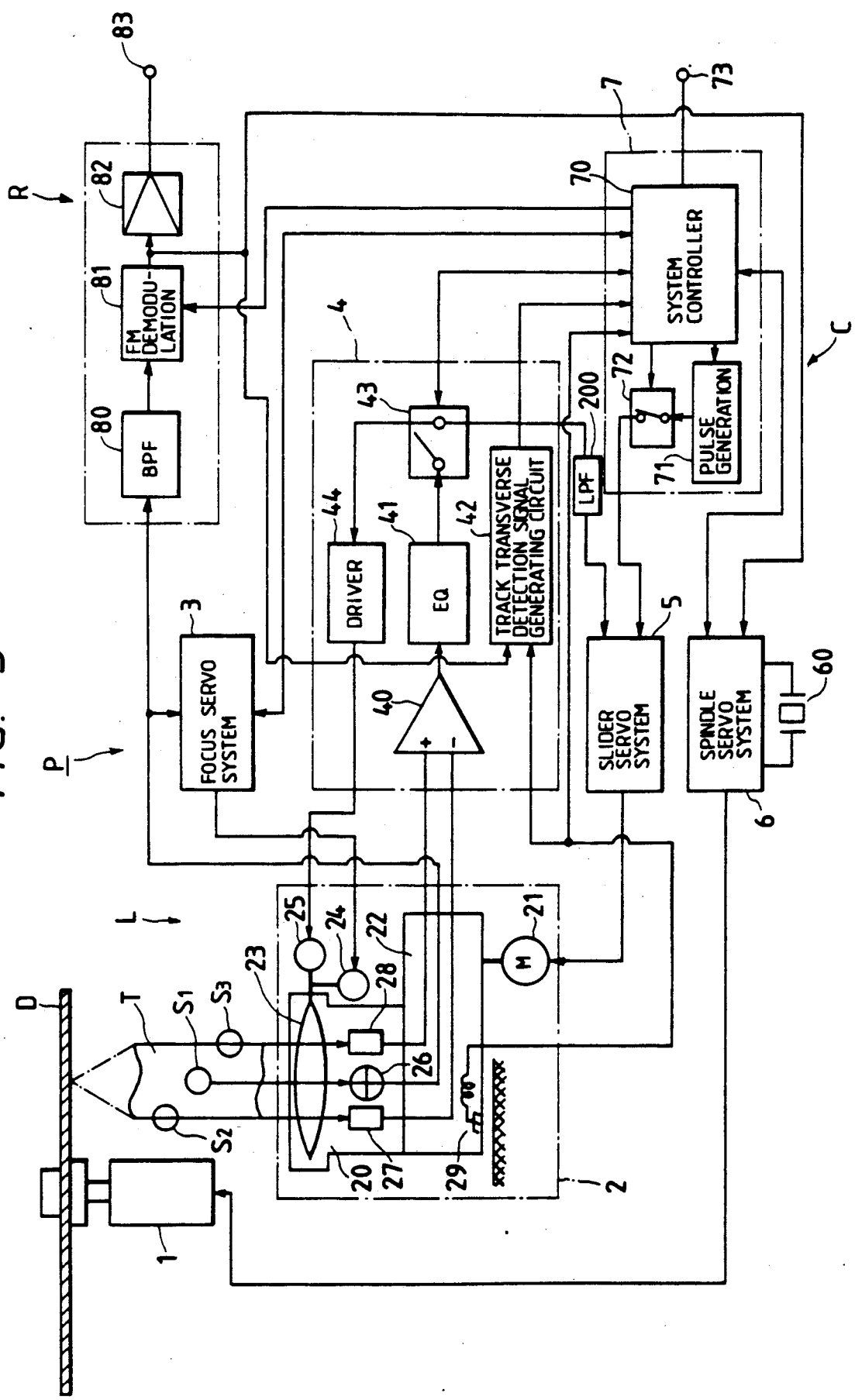
FIG. 3 is another block diagram of the optical apparatus for reproducing an information recording medium provided with the track transverse detection signal generating circuit according to the present invention.

According to the embodiment shown in FIG. 1, an example is shown in which the track transverse detection signal generating circuit 42 receives the tracking error signal which is the output from the differential amplifier 40 as the presence signal and the track transverse detection signal is generated by detecting the change in the presence signal. However, another embodiment of optical disk player may be employed in which the track transverse detection signal generating circuit 42 receives a demodulated signal of the RF signal as another presence signal from the FM demodulation circuit 81 so as to generate the track transverse detection signal as shown in FIG. 3. In this case, a speed signal denoting the moving speed of the slider 22, that is, the speed of the optical pickup 20, detected by the speed detection coil 29 is supplied not only to the track transverse detection signal generating circuit 42 but also to the system controller 70. The system controller 70 supplies a control signal to the FM demodulation circuit 81 in response to the speed signal. The control signal thus supplied changes a time constant of the FM demodulation circuit 81 corresponding to the moving speed of the optical pickup 20. As a result, in the case where the moving speed of the optical pickup 20 is higher than the normal speed, the level of the demodulated signal is amplified.

Track transverse detection signal generating circuit

First Embodiment

FIG. 4 is a circuit diagram which illustrates a first embodiment of the track transverse detection signal generating circuit 42A according to the present invention.

The track transverse detection signal generating circuit 42A comprises an amplifying circuit 101, a control signal generating circuit 102 and a voltage comparator 103A.

The amplifying circuit 101 serves as presence signal amplifying means which receives the presence signal such as the tracking error signal, the amplifying circuit 101 being switched on by a switch $SW_1$ so as to serve as an active low pass filter in a normal reproducing operation and switched off to serve as an operational amplifier exhibiting a high amplification gain at the time of the track jump reproducing and the high speed access reproducing operation.

The control signal generating circuit 102 serves as control means which receives a speed signal corresponding to the moving speed of the optical pickup 20, that is, the moving speed of the optical spot 20 for reading information in the radial direction of the disk D and supplies a signal for controlling the operation of the switch $SW_1$ to the amplifying circuit 101 if the level of the speed signal exceeds a predetermined range.

The voltage comparator 103A serves as presence signal comparison means which receives an output from the amplifying circuit 101 and subjects it to a comparison with a predetermined reference value. If the output from the amplifying circuit 101 thus received exceeds the reference value, the voltage comparator 103A outputs a pulse-shaped track transverse detection signal.

The amplifying circuit 101 comprises an amplifying part and a filter circuit. The amplifying part comprises an operational amplifier 104 and resistors $R_1$ and $R_2$. A positive input terminal of the operational amplifier 104 is grounded. The resistor $R_1$ is connected to a negative input terminal of the operational amplifier 104 at a point $P_1$. The resistor $R_2$ serves as a negative feedback resistor which is connected in parallel to a position between the point $P_1$ and an output terminal of the operational amplifier 104. The filter circuit is connected in parallel to two terminals of the resistor $R_2$. The filter circuit is formed by the switch $SW_1$, a resistor $R_3$ and a capacitor $C_1$ which are connected to one another in series.

The control signal generating circuit 102 comprises a buffer amplifier 105, a noise filter 106 and a window comparator 107. The buffer amplifier 105 receives an induced voltage which is the speed signal transmitted from the speed detection coil 29 as an input and amplifies it up to a proper signal level so as to output it.

The noise filter 106 comprises a resistor $R_4$ and a capacitor $C_2$. A terminal of the resistor $R_4$ is connected to an output terminal of the buffer amplifier 105. The other terminal of the resistor $R_4$ is connected to the capacitor $C_2$ at a point $P_2$. The other terminal of the capacitor $C_2$ is grounded. The noise filter 106 separates an unnecessary frequency component from the speed signal so as to eliminate the component.

The window comparator 107 has an input terminal connected to the noise filter 106 at the point $P_2$. The window comparator 107 stores two reference voltage levels $V_1$ and $-V_1$. The voltage $V_1$ is determined to be an induced voltage level of the detection coil 29 which corresponds to a speed lower than the moving speed of the optical pickup 20 perpendicularly to the direction of the recording track on the optical disk in a special reproducing operation. The voltage $-V_1$ is determined to be an induced voltage level of the detection coil 29 which corresponds to a speed lower than the moving speed of the optical pickup 20 in a special reproducing operation in a reversed direction. The window comparator 107 generates a switch control signal (for example, a high level voltage) which causes the switch $SW_1$ to be switched off if the input voltage exceeds a range, that is called a "window", defined by the two reference voltage levels $V_1$ and $-V_1$.

The voltage comparator 103A is connected to an output side of the amplifying circuit 101, that is, the output terminal of the operational amplifier 104.

The voltage comparator 103A receives the presence signal amplified and transmitted from the operational amplifier 104, and subjects it to a comparison with a predetermined reference voltage $V_{ref}$ (for example 0 V). If the presence signal exceeds the reference voltage $V_{ref}$, the voltage comparator 103A outputs a pulse-shaped track transverse detection signal. As an alternative embodiment, comparator 103A may output the pulse-shaped signal each time the presence signal is lower than $V_{ref}$.

The switch $SW_1$ of the amplifying circuit 101 is in a connected state at the time of the operation for reproducing the optical disk in a normal manner. In this state, the active low pass filter is realized by the resistor $R_3$ and the capacitor $C_1$, the low pass filter acting to suppress a medium and high frequency noise components contained in the presence signal such as the received tracking error signal.

However, if the operation mode of the player has been shifted to the special reproducing operation mode, the detection coil 29 detects the speed of the moving speed of the optical pickup 20, that is, the optical spot for reading information, the speed thus detected being higher than that at the normal reproducing operation. As a result, the detection coil generates high induced voltage $V_H$ ($|V_H| > |V_1|$) which corresponds to the speed thus detected. The induced voltage $V_H$ is amplified by the buffer amplifier 105 and is supplied to the window comparator 107 via the noise filter 106. In this case, the window comparator 107 generates the switch control signal (for example, the high level voltage output) to supply it to the switch $SW_1$. The switch $SW_1$ is switched off in response to this switch control signal. As a result, the circuit acting as the low pass filter is turned off. Therefore, since only the resistor $R_2$ gives the negative feedback to the operational amplifier 104, the level of the negative feedback resistance is raised. Therefore, the amplification gain of the operational amplifier 104 is increased. As a result, since a high output from the amplifying circuit 101 is supplied to the voltage comparator 103A, the voltage comparator 103A can reliably output the pulse-shaped track transverse detection signal.

Second Embodiment

According to the first embodiment, the structure is arranged in such a manner that the gain of the amplifying circuit 101 can be switched to the two levels in accordance with the moving speed of the optical pickup 20, that is, the speed of the optical spot for reading information. However, a second embodiment 42B can be preferably employed in the present invention, the second embodiment 42B being arranged in such a manner that two or more series circuits for forming a plurality of filter means having resistors $R_{11}$ to $R_{1n}$ and capacitors $C_{11}$ to $C_{1n}$ are provided for changing the gain and frequency (equalization) characteristics of the amplifying circuit 101 into three or more levels by a rotary switch $SW_2$ or the like as shown in FIG. 5. That is, the combination of a registor and a capacitor is selected so that the gain of the operational amplifier 104 and a cutoff frequency are raised in the case of a high speed track jumping.

Third Embodiment

Figure 6:
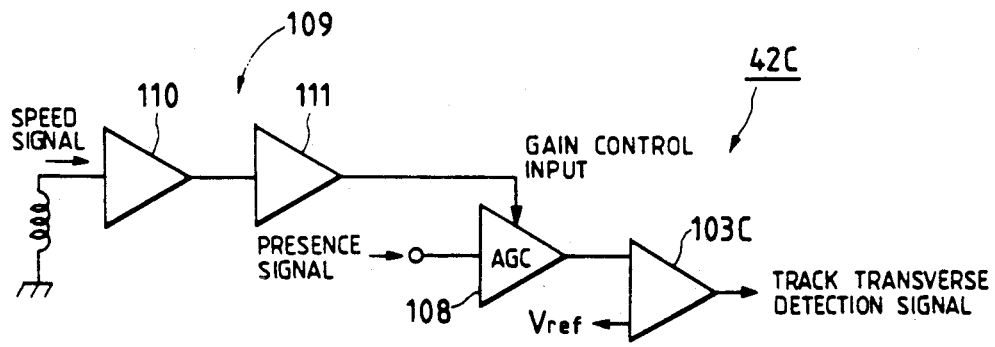

FIG. 6 illustrates a third embodiment 42C of the track transverse detection signal generating circuit according to the present invention.

The track transverse detection signal generating circuit 42C comprises an automatic gain control (AGC) amplifier 108, a control signal generating circuit 109 and a voltage comparator 103C.

The AGC amplifier 108 serves as presence signal amplifying means, being capable of adjusting its gain with a level of a gain control input voltage.

The control signal amplifying circuit 109 serves as control means which includes a buffer amplifier 110 and an absolute-value amplifier 111. The buffer amplifier 110 amplifies the induced voltage generated by the speed detection coil 29 up to a proper level. The absolute-value amplifier 111 is connected to the buffer amplifier 110 so as to convert an output from the buffer amplifier 110 into an absolute-value and to supply it to the AGC amplifier 108 as a gain control input.

The voltage comparator 103C is arranged to receive an output from the AGC amplifier 108 so as to subject it to a comparison with a predetermined reference voltage $V_{ref}$ (for example, 0 V). If the voltage comparator 103C determines that the output of the AGC amplifier exceeds the reference voltage $V_{ref}$, the voltage comparator 103C outputs a pulse signal. The third embodiment 42C exhibits an advantage in that the gain of the AGC amplifier 108 can be continuously controlled in accordance with the moving speed of the slider 22 and the gain can be continuously strengthened in proportion to the moving speed of the slider 22.

Fourth Embodiment

Figure 7:
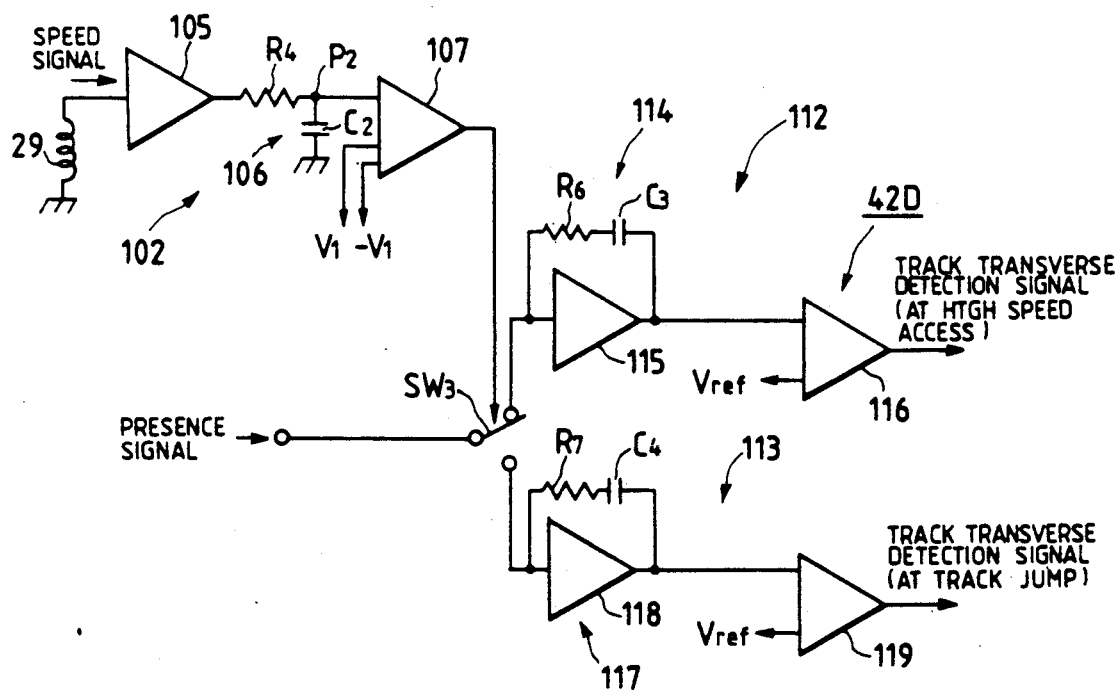

FIG. 7 illustrates a fourth embodiment of the track transverse detection signal generating circuit 42D according to the present invention.

The track transverse detection signal generating circuit 42D comprises the control signal generating circuit 102, a switch SW$_3$ and presence signal amplifying/comparison circuits 112 and 113.

The control signal generating circuit 102 serves as control means having the same function as those shown in FIGS. 4 and 5.

The switch SW$_3$ has an input terminal to which the presence signal is supplied and two output terminals to which the presence signal amplifying/comparison circuits 112 and 113 are connected. The switch SW$_3$ is connected to the control signal generating circuit 102 so as to switch the output terminal thereof to be connected to the circuit 112 or 113 in response to the control signal supplied from the control signal generating circuit 102.

In the presence signal amplifying/comparison circuit 112, a first amplifying circuit 114 serving as presence signal amplifying means and a first voltage comparator 116 serving as presence signal comparison means are connected to each other in series.

In the presence signal amplifying/comparison circuit 113, a second amplifying circuit 117 serving as presence signal amplifying means and a second voltage comparator 119 serving as presence signal comparison means are connected to each other in series.

The first amplifying circuit 114 comprises a first operational amplifier 115 and a first low pass filter. The first low pass filter is formed by connecting a resistor R$_6$ and a capacitor C$_3$ in series, a first low pass filter being connected in parallel to input and output terminals of the first operational amplifier 115. The whole structure of the first amplifying circuit 114 has a high cut-off frequency and a high gain.

The first voltage comparator 116 receives an output from the first amplifying circuit 114 as its input so as to subject it to a comparison with a predetermined reference voltage V$_{ref}$ (for example, 0 V). If the first voltage comparator 116 determines that the output of the first amplifying circuit 114 exceeds the reference voltage V$_{ref}$, the first voltage comparator 116 outputs a pulse-shaped track transverse detection signal.

The second amplifying circuit 117 comprises a second operational amplifying circuit 118 and a second low pass filter. The second low pass filter is formed by connecting a resistor R$_7$ and a capacitor C$_4$ in series, the second low pass filter being connected to input and the output terminals of the second operational amplifier 118 in parallel. The overall structure of the second amplifying circuit 117 has a lower cut-off frequency and a lower gain than those of the circuit 114.

The second voltage comparator 119 receives an output from the second amplifying circuit 117 as its input so as to subject it to a comparison with a predetermined reference voltage V$_{ref}$ (for example, 0 V). If the second voltage comparator 119 determines that the output of the second amplifying circuit 117 exceeds the reference voltage V$_{ref}$, the second voltage comparator 119 outputs a pulse-shaped track transverse detection signal.

According to the fourth embodiment 42D, the switch SW$_3$ can be switched by the induced voltage of the speed detection coil 29 which is the speed signal. Therefore, the high gain circuit 112 can be selected at the time of the high speed accessing operation, while the low gain circuit 113 can be selected at the time of a normal track jumping operation. As a result, the gain of the amplification and the frequency characteristics of the presence signal can be switched in accordance with the level of the speed signal.

Fifth Embodiment

In the track transverse detection signal generating circuit 42D according to the fourth embodiment shown in FIG. 7, it is arranged that the gain of the presence signal can be switched into only two levels. However, a fifth embodiment 42E, shown in FIG. 8, may be effectively employed in which three or more circuits 120 to 125 are provided and the gain and the equalization characteristics can be switched into three or more levels by a switch SW$_4$. A plurality of circuits 120 to 125 are provided in parallel. The circuits 120 to 125 have amplifying circuits 130 to 135 and comparators 150 to 155, respectively. The amplifying circuits 130 to 135 have resistors R$_8$ to R$_{13}$ and capacitors C$_5$ to C$_{10}$, respectively.

According to the above-described embodiments 42A to 42D, a high frequency component gain of the presence signal amplifying means is selected by switching in accordance with the moving speed of the optical pickup, that is, the moving speed of optical spot for reading information. However, the present invention is not limited to the above-described structure. The overall frequency gain of the presence signal amplifying means or the reference voltage V$_{ref}$ of the presence signal comparison means may be selected. It is necessary for the structure to be arranged in such a manner that at least one of a gain of the presence signal amplifying means, equalization characteristics thereof and a reference voltage V$_{ref}$ of the presence signal comparison means can be selected.

Fifth Embodiment

Figure 8:
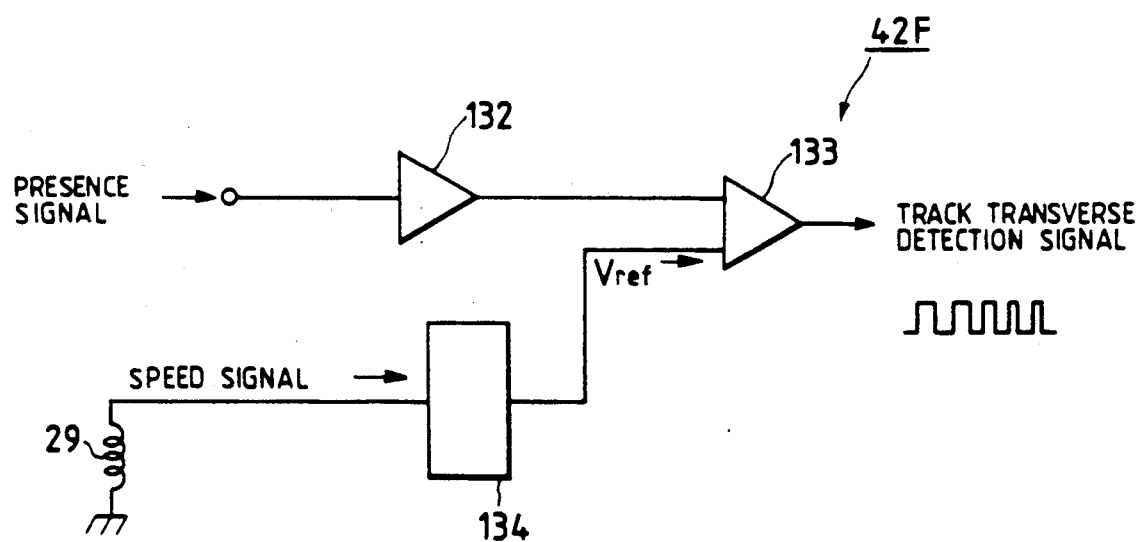

A fifth embodiment 42F shown in FIG. 8 is arranged in such a manner that control means 134 controls a reference voltage V$_{ref}$ of a comparator 133 serving as the presence signal comparison means in accordance with the induced voltage of the speed detection coil 29 serving as the speed signal. The comparator 133 makes a comparison between an output from a presence signal amplifying means 132 and the reference voltage V$_{ref}$ which is subjected to the control of control means 134 to output it.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A track transverse detection signal generating circuit for detecting a track jumping operation of an optical pickup in an optical apparatus for reproducing information recorded on an information recording medium, which comprises;
    presence signal amplifying means for amplifying a presence signal of an optical spot for reading information on a recording track of said optical information recording medium, said presence signal having an amplification level and equalization characteristics;

presence signal comparison means for receiving said presence signal which has been amplified and transmitted from said presence signal amplifying means, for making a comparison between said amplified presence signal and a reference value, and for transmitting a track transverse detection signal indicating that said optical spot for reading information has traversed said recording track;

speed detecting means for detecting a moving speed of the pickup in a radial direction of the pickup; and means for controlling said amplification level, said equalization characteristics or a reference level of said presence signal comparison means in response to said moving speed of said pickup.

2. A track transverse detection signal generating circuit according to claim 1, where said presence signal is an electric signal of a tracking error signal corresponding to the difference between two outputs from optical-/electrical converting elements which receive a reflected beam from said optical spot for reading information.

3. A track transverse detection signal generating circuit according to claim 1, wherein said presence signal is a demodulated signal is from an RF signal read from said optical spot for reading information.

4. A track transverse detection signal generating circuit according to claim 3, further including a FM demodulation circuit from which said demodulated signal is obtained, said FM demodulation circuit including multiple time constants, wherein one of said multiple time constants is chosen in accordance with said moving speed.

5. A track transverse detection signal generating circuit according to claim 1, wherein said presence signal amplifying means comprises an operational amplifier, a negative feedback resistor connected to said operational amplifier in parallel, at least one filter circuit and a switch for connecting or disconnecting said filter circuit to said operational amplifier, and said control means comprises a window comparator which transmits a signal for switching off said switch when said speed signal deviates from a range defined by two reference levels of said window comparator.

6. A track transverse detection signal generating circuit according to claim 5, wherein a plurality of said filter circuits are provided.

7. A track transverse detection signal generating circuit according to claim 1, wherein said control means comprises an absolute-value amplifier, and said presence signal amplifying means comprises an automatic gain control amplifier arranged to use an output from said absolute-value amplifier as its control input so that a gain of said automatic gain control amplifier is adjusted in accordance with a change in said speed signal.

8. A track transverse detection signal generating circuit according to claim 1, wherein said control means comprises a window comparator and a switch, and said presence signal amplifying means and said presence signal comparison means comprise a plurality of amplifying/comparison circuits formed by connecting amplifying circuits and comparators in series, and said switch selects one of said plurality of amplifying/comparison circuits in accordance with an output signal from said window comparator.

* * * * *